UNITED STATES PATENT OFFICE.

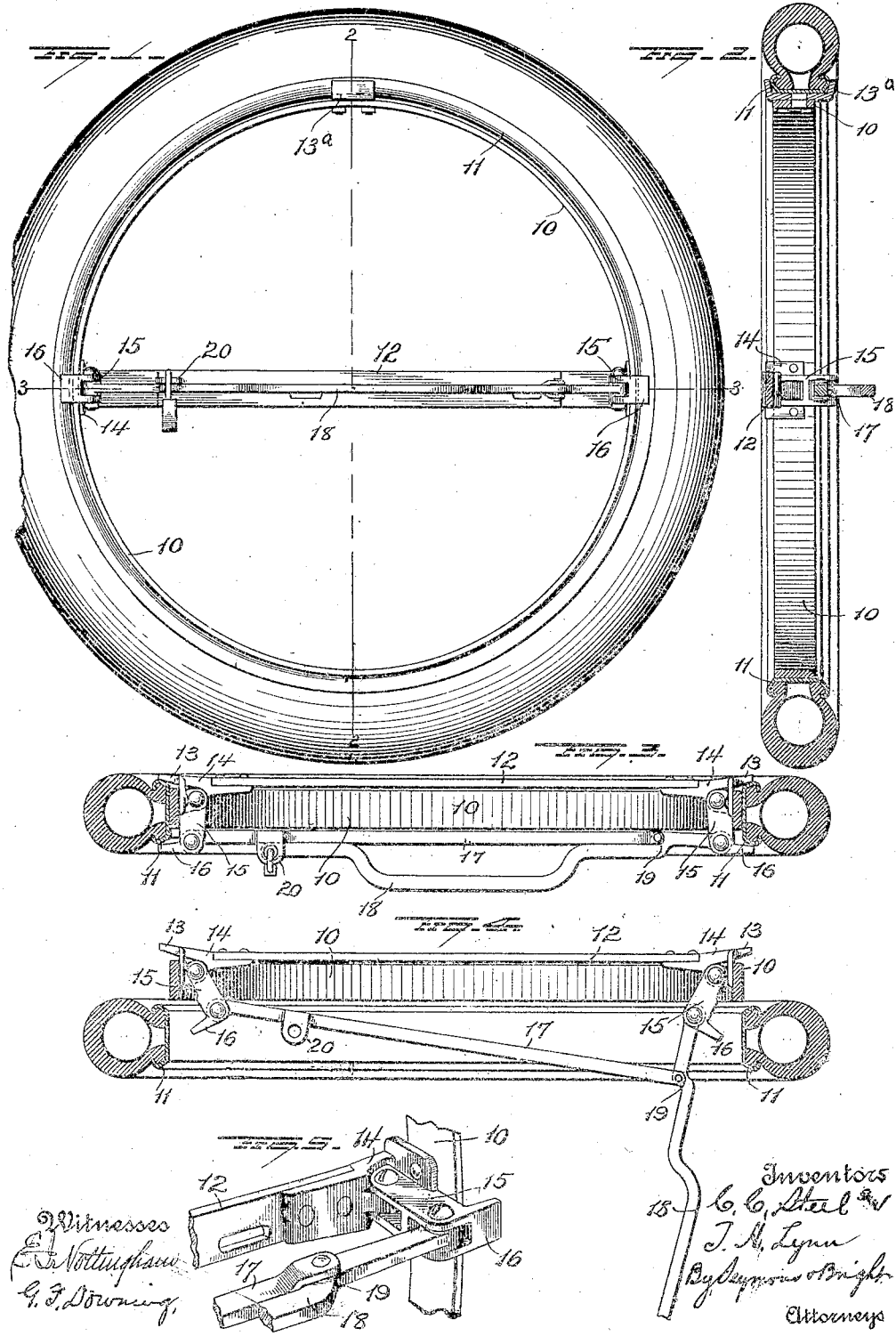

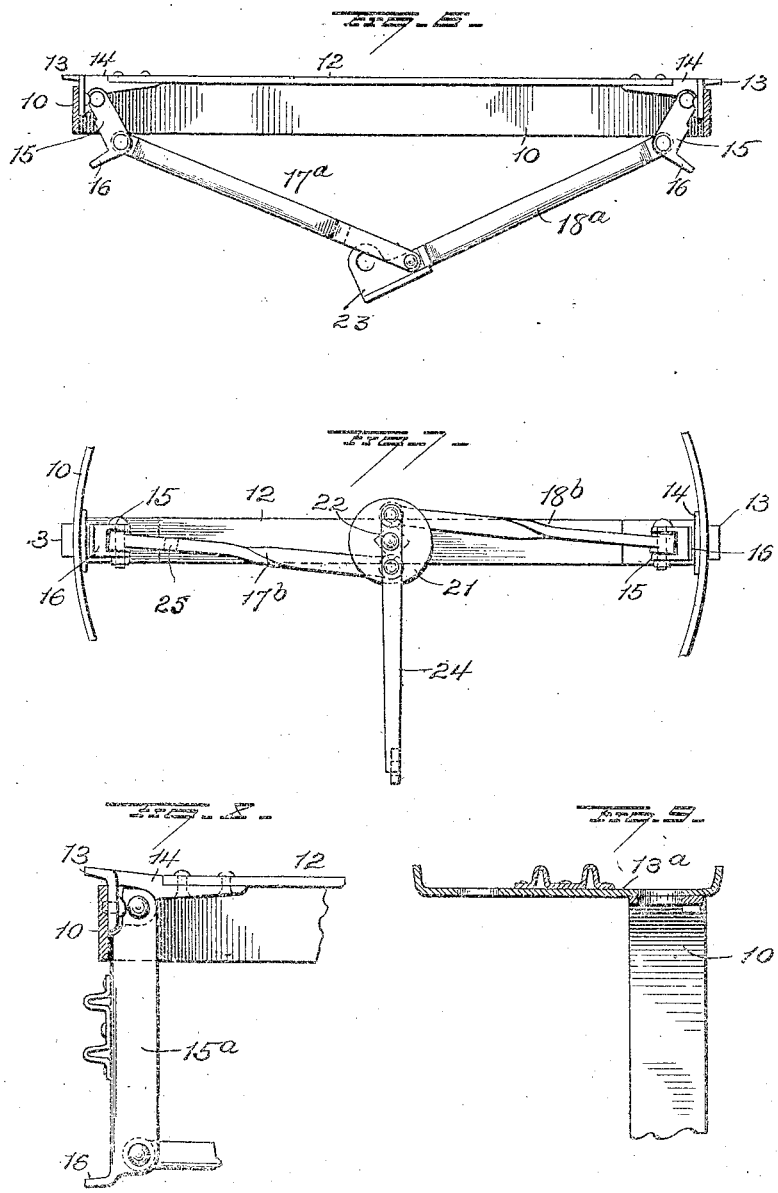

CHARLES CLAIR STEEL AND THOMAS H. LYNN, OF WILLIAMSPORT, PENNSYLVANIA.

TIRE-CARRIER FOR AUTOMOBILES.

1,327,742.

Specification of Letters Patent.  Patented Jan. 13, 1920.

Application filed March 7, 1919. Serial No. 281,208.

*To all whom it may concern:*

Be it known that we, CHARLES C. STEEL and THOMAS H. LYNN, citizens of the United States, and residents of Williamsport, in the county of Lycoming and State of Pennsylvania, have invented certain new and useful Improvements in Tire-Carriers for Automobiles; and we do hereby declare the following to be a full, clear, and exact description of the invention, such as will enable others skilled in the art to which it appertains to make and use the same.

Our invention relates to an improvement in tire carrier for automobile, the object being to provide an improved device adapted to be secured at the rear end or at the side of an automobile for safely carrying one or more extra demountable rims or tires, and it consists in the details of construction as will be more fully described and pointed out in the claims.

In the accompanying drawings Figure 1 is a view in elevation of our improvement showing a rim with a tire thereon, secured to the carrier; Fig. 2 is a view in section of the same on the line 2—2 of Fig. 1; Fig. 3 is a similar view on the line 3—3 of Fig. 1; Fig. 4 is a view similar to Fig. 3 showing the rim locking means open and the rim and its tire detached; Fig. 5 is an enlarged view of one of the locking links and part of the toggle lever, ring, and the ring brace, and Figs. 6, 7, 8 and 9 are views of modifications.

10 represents a ring or hoop made of metal and of a size to snugly fit within a standard size rim 11 and form a solid support for the latter. This ring should be no wider than the rim and is preferably of less width, so that the latter will, when on the ring, be directly engaged by the lugs on the ring and links, and be held firmly from any movement and against removal, except of course by the one having the key to the lock.

The ring 10 is strengthened by the transverse brace 12, and is adapted to be secured by any means to the automobile preferably at the rear thereof.

Secured to the ring 10, at the top, is the saddle 13ᵇ in which the rim 11 snugly rests and which absolutely prevents any displacement of the rim or tire at the top. The brace 12 is secured at its ends to the brackets 14 riveted to the inner face of the ring 10, and each bracket is provided with a lug 13 projecting beyond the periphery of the ring and in a position to engage one side of the demountable rim for holding the latter against displacement in one direction. These lugs 13 are located at diametrically opposite points on the ring, and the brackets carrying the lugs are tied together by the brace 12.

Pivotally secured to the two brackets 14 are the links 15, each of which is provided at its outer end with an integral lug 16, adapted when the links are in closed or locking position to project outwardly beyond the ring 10 and engage the rim 11 at a point directly opposite its companion lug 13, the two lugs 13 and 16 being separated sufficiently to receive a standard size rim between them. The two pivoted links 15 are connected by the two levers 17 and 18, the lever 17 being pivotally secured at one end to one link and pivoted at its other end to an elbow 19 on lever 18. Lever 18 is pivoted at one end to a link 15 and is free at its other end, its free end terminating alongside of the perforated shoulder 20 on lever 17. It is provided at its free end with a hole for the passage of the hasp of a lock which also passes through the hole in the shoulder 20 for locking the parts in their closed position.

With this construction it will be seen that by unlocking the lever 18 and moving it to its open position as shown in Fig. 4, the two links 15 will be drawn inwardly thus removing the lugs 16 out of the plane of the outer surface of the ring, and permitting a tire on the ring to be removed or one to be placed in position. As before explained each ring is adapted to receive a standard rim, and after the latter has been placed in position and locked in place, it will be held against the possibility of accidental loss or displacement, and can not be removed except by the release of the locking means connecting the free end of the lever 18 to the lever 17.

It will also be seen that the tire is carried on a ring and is therefore equally supported throughout its entire inner surface which prevents sagging or distortion due to the weight and vibration, and which also prevents injurious contact of the links with the rim or tire. Again by locating the links within the ring and bracing the ring on a line with the links, any spreading of the ring and the rim thereon, due to the action of the lever is prevented.

In special cases where it is desirable to carry two tires, elongated links 15ª and saddle 13ª shown in Figs. 8 and 9 can be substituted for the shorter ones shown in the other figures. With such construction one tire would be carried on the ring and the other on the extension of the links. Again instead of employing the levers shown in Figs. 1 and 5 inclusive, for manipulating and locking the links, we may employ two levers 17ª 18ª of about equal length pivoted together approximately at the center of the ring as shown in Fig. 6, or we may connect the ends of two levers 17ᵇ 18ᵇ to a disk 21 as shown in Fig. 7, the disk being mounted on a post 22 secured to the brace 12. In the construction shown in Fig. 6, the free end of lever 18ª is provided with a projection 23 adapted to pass through the bifurcated end of lever 17ª and be locked by a lock the hasp of which passes through a hole in projection 23. In the construction shown in Fig. 7 the handle 24 is provided at its free end with a projection having a hole therethrough which alines with a hole 25 in lever 18ᵇ for the passage of a locking device.

It is evident that many slight changes might be resorted to in the relative arrangement of parts shown and described without departing from the spirit and scope of our invention hence we would have it understood that we do not wish to confine ourselves to the exact construction and arrangement of parts shown and described, but Having fully described our invention what we claim as new and desire to secure by Letters Patent, is:—

1. In a tire carrier, the combination of a ring forming a continuous seat for a tire rim, two oppositely disposed fixed lugs projecting outwardly beyond the periphery of the ring for engagement with one edge or side of the rim, a centrally disposed brace for the ring, pivoted links located within the ring and each provided with an outwardly projecting lug, the lugs on the links adapted to engage the other edge or side of the tire, and lever mechanism connecting the two links for holding them in locking position and for moving them into and out of locking position.

2. In a tire carrier, the combination of a ring forming a continuous seat for a tire rim, two oppositely disposed fixed lugs projecting outwardly beyond the periphery of the ring for engagement with one edge or side of the rim, a brace for the ring, the said brace being located intermediate the two fixed lugs, pivotal links located within the ring, each link being provided with an outwardly projecting lug, the lugs on the links adapted to engage the other edge or side of the rim, and lever mechanism connecting the two links, whereby the lugs on the latter may be moved into and out of locking position.

3. In a tire carrier, the combination of a ring forming a continuous seat for a tire rim, a centrally disposed brace, fixed lugs in line with the brace and projecting outwardly beyond the periphery of the ring to engage one edge or side of a rim, a link pivotally secured within the ring adjacent each end of the brace, each link having an outwardly projecting lug to engage the other edge or side of the rim, and lever mechanism for moving the links and lugs thereon into locking and unlocking position.

4. In a tire carrier, the combination of a ring forming a continuous seat for a tire rim, brackets secured to the inner face of the ring at diametrically opposite points, a brace connecting the two brackets, fixed lugs located in line with the brace and projecting beyond the periphery of the ring to engage one side or edge of the rim, links pivoted to the brackets and each provided with an outwardly projecting lug to engage the other side or edge of the rim, and lever mechanism for moving said links.

5. In a tire carrier, the combination of a ring forming a continuous seat for a tire rim, oppositely disposed brackets secured to the inner face of the rim, each bracket having a fixed lug projecting outwardly beyond the periphery of the ring to engage one side or edge of a rim, a brace secured at its ends to the brackets, links pivoted to the brackets and each having a lug adapted to project outwardly beyond the ring and engage the other side or edge of the rim and lever mechanism for actuating the links.

In testimony whereof we have signed this specification.

CHAS. CLAIR STEEL.
THOMAS H. LYNN.